Aug. 5, 1924.
T. L. PARKER
MILES PER GALLON REGISTER
Filed April 3, 1922    2 Sheets-Sheet 1
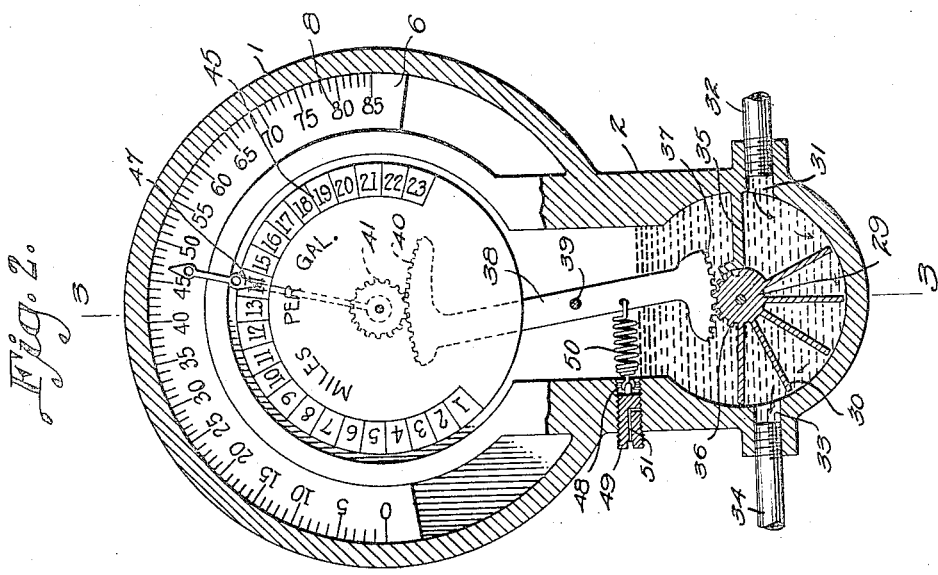
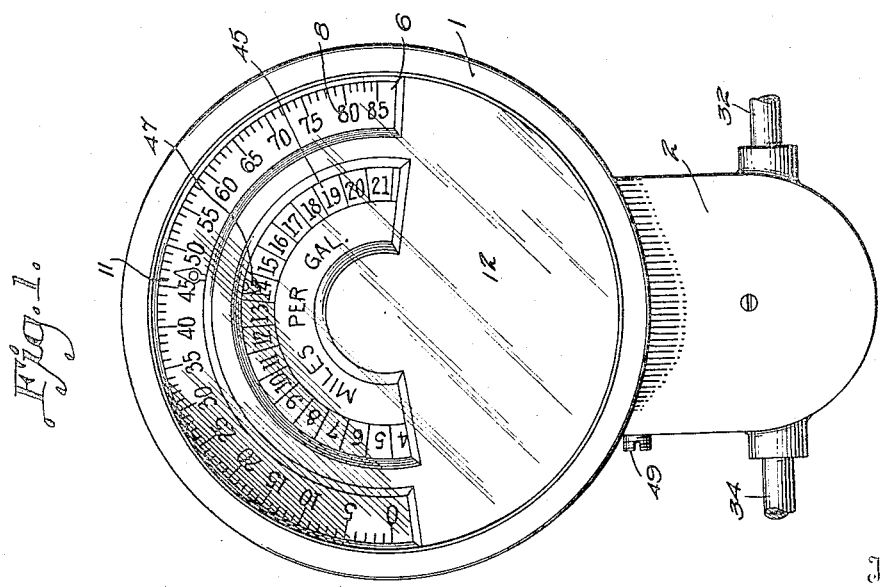
Inventor
T. L. Parker
By _____ Attorney

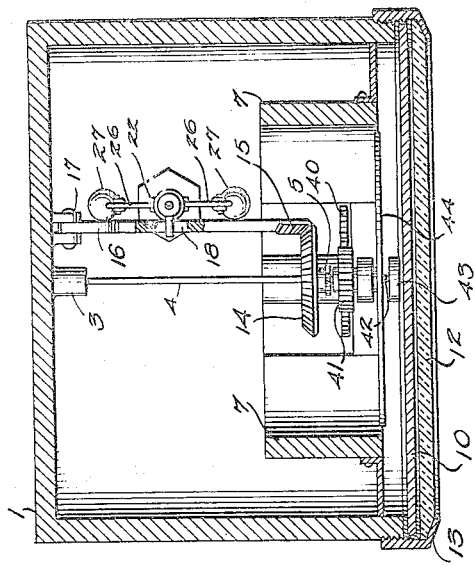

UNITED STATES PATENT OFFICE.

THOMAS L. PARKER, OF WIBAUX, MONTANA.

MILES-PER-GALLON REGISTER.

Application filed April 3, 1922. Serial No. 549,178.

*To all whom it may concern:*

Be it known that I, THOMAS L. PARKER, a citizen of the United States, residing at Wibaux, in the county of Wibaux and State of Montana, have invented certain new and useful Improvements in Miles-per-Gallon Registers, of which the following is a specification.

This invention relates to registers and more particularly to a register for indicating the rate of fuel consumption of motor vehicle engines.

An object of the invention is the provision of a register that will indicate by direct reading, in miles per gallon, the mileage being obtained from the fuel at all times, irrespective of the speed of the car.

A further object is the provision of a register which may be attached to the ordinary speedometer and operate in conjunction therewith.

With the reading before the driver at all times, it is relatively simple to make adjustments of carburetor and speed to obtain the greatest economy of operation. The device further acts as an indicator when anything happens to cut down the efficiency of the motor, warning the operator and giving him an opportunity to locate the trouble before serious injury has occurred.

In the accompanying drawings, I have shown one embodiment of the invention. In this showing:

Figure 1 is a front elevation of the speedometer showing the invention applied,

Figure 2 is a vertical sectional view on line 2—2 of Figure 3,

Figure 3 is a similar view on line 3—3 of Figure 2, and,

Figure 4 is a horizontal sectional view on line 4—4 of Figure 3.

Referring to the drawings, the reference numeral 1 designates a casing which is substantially cylindrical and is provided with a lower extension 2. A speedometer of the usual construction is arranged within the casing. As shown, a bearing 3 is arranged in the rear wall, adapted to support a shaft 4. A needle 5 is connected to this shaft to revolve therewith. An arcuate plate 6 is supported between the top of the casing and a partition wall 7. This plate is provided with suitable indicia 8 to cooperate with the needle 5, to indicate the speed of the car in the usual manner. As shown, the upper end of the needle is offset, as at 9, and arranged in front of the plate. The front of the casing is closed by a plate 10, having a slot 11 formed therein in front of the plate 6. A glass cover 12 is retained on the front of the casing by a suitable fastening ring 13. Suitable packing is provided to render the casing air-tight.

A bevel gear 14 is arranged on the shaft 4 and is adapted to mesh with a segmental gear 15, carried by a pivoted arm 16. As shown, this arm is mounted in a suitable bracket 17 and is provided with an elongated slot 18. A drive shaft 19 extends upwardly through the casing, being connected to the usual flexible drive 20. This shaft is supported in suitable bearings carried by brackets 21 and is provided with a pair of collars 22 and 23. The lower collar rests upon the lower bearing 21 and the collars are normally held spaced from each other by means of a spring 24. Arms 25 are pivoted to the collar 22 and arms 26 are pivoted to the collar 23. The arms 26 are provided with balls 27 on their outer ends. The collar 23 is provided with a pin 28 which is received in the slot 18. The speedometer operates in the usual manner, the speed of the vehicle tending to throw the balls 27 outwardly by centrifugal force against the tension of the spring 24, thus drawing the collar 23 downwardly and swinging the arm 16 on its pivot. This revolves the shaft 4 through the medium of gears 14 and 15, and causes the needle 5 to travel in a clockwise direction.

The fuel meter forming the subject matter of the present invention consists of a rotatable shaft 29 which is arranged in the lower extension 2 and is provided with blades 30, closely fitting within the extension. The extension is provided with an inlet opening 31 adapted to be connected to the fuel tank by a pipe 32 and an outlet opening 33 adapted to be connected to the carburetor by a pipe 34. A plate 35 is arranged transversely of the extension above the fuel inlet opening to force the fuel to flow downwardly around the blades 30 as indicated by the arrows in Figure 2 of the drawings.

The shaft 29 is provided with gear teeth 36 adapted to mesh with a segmental gear 37, formed on the lower end of a lever 38. As shown, the lever is pivoted at 39 and extends upwardly into the main portion of the casing. The upper end of the lever is provided with a segmental gear 40, meshing with a pinion 41 carried by a shaft 42. The shaft 42 is hollow and extends over the shaft 4. The front end of the shaft 4 is mounted in a bearing carried by an arm 43 arranged behind the plate 10. A disk 44 is secured to the shaft 42 and is arranged in substantially the same vertical plane as the plate 3. This disk is provided with suitable indicia 45 to indicate miles per gallon of fuel consumed, and the indicia is arranged behind an arcuate slot 46 in the plate 10. The needle 5 is provided with a downwardly extending indicating finger 47 adapted to cooperate with the indicia on the mileage disk. The upper portion of the extension 2 is provided with a threaded opening 48 adapted to receive a plug 49. A spring 50 is secured to this plug and to the pivoted arm 38.

In assembling the device, the fuel line is connected to the openings 31 and 33 and the plug 49 is screwed in. As shown, this plug is provided with a port 51. The plug is screwed in sufficiently to permit communication between the interior of the casing and the atmosphere through the port 51, thus permitting escape of air from the interior of the instrument. Pressure is then applied to the tank and the fuel is forced into the casing. When the fuel reaches a height sufficient to flow out of the port 51, the plug is again screwed outward until the port is shut off from communication with the interior of the casing. This imprisons the air in the upper part of the device, and thereafter the fuel level will remain constant. The plug further serves to permit regulation of the tension of the spring 50. This spring is adapted to draw the arm 38 toward the side wall of the casing and furnish a zero reading in the disk 44 when no fuel is passing through the meter.

In the operation of the device, assuming that the vehicle is traveling at a speed of forty-seven miles per hour, as indicated in Figure 2 of the drawings, the flow of the fuel through the fuel chamber is impeded by the blades. As the fuel passes the blades, a pressure is exerted on them in proportion to the flow of the fuel and the shaft 29 is oscillated causing the disk 44 to revolve through a portion of a circle in a clockwise direction against the tension of spring 50. As the device is illustrated, a fuel consumption of fourteen miles per gallon of gasoline or other fuel is indicated. Assuming that the speed of the vehicle is increased to fifty-seven miles per hour without change in fuel consumption, there will then be no movement of the disk 44 but the needle 5 will advance to fifty-seven miles per hour and the extension 47 will intersect the disk 44 at a point showing a mileage rate of sixteen miles per gallon of fuel instead of fourteen, as before, or if the speed of forty-seven miles per hour be maintained and by means of a more efficient adjustment, or other cause, the consumption of fuel is decreased, the disk will then rotate in a counter-clockwise direction due to the reduction of pressure on the blades 30, showing a corresponding higher mileage reading.

In the accompanying drawings, the device is shown as an attachment to an ordinary type of needle reading speedometer. It will be apparent that various other forms may be employed to obtain the desired result.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the character described, a speedometer casing having an extension forming a meter casing, an indicating member arranged in said casing and connected to the vehicle to vary its position according to the speed of the vehicle, a disk mounted adjacent said indicating member, said disk being provided with suitable indicia to indicate mileage per unit of fuel consumed, a rotatably mounted element arranged in said meter casing and adapted to alter its position according to the flow of fuel through said casing, a spring adapted to normally retain said disk in a zero indicating position, and connections between said rotatably mounted element and said disk to vary the position of said disk.

2. In a device of the character described, a speedometer casing having an extension forming a meter casing, an indicating member arranged in said casing and connected to the vehicle to vary its position according to the speed of the vehicle, a disk mounted adjacent said indicating member, said disk being provided with suitable indicia to indicate mileage per unit of fuel consumed, a rotatably mounted element arranged in said meter casing and adapted to alter its position according to the flow of fuel through said casing, a spring adapted to normally retain said disk in a zero indicating position, connections between said rotatably mounted element and said disk to vary the position of said disk, and common means for adjusting the tension of said spring and governing the height of liquid in said meter casing.

3. In a device of the character described, a speedometer casing having a depending extension forming a meter casing adapted to contain liquid to a predetermined level, inlet and outlet pipes communicating with said casing, said casing being provided with a threaded opening extending therethrough substantially at the predetermined level of the liquid, a threaded plug arranged in said opening, an indicating member arranged in said casing and connected to the vehicle to vary its position according to the speed of the vehicle, a disk mounted adjacent said indicating member, said disk being provided with suitable indicia to indicate mileage per unit of fuel consumed, a rotatably mounted element arranged in said meter casing and adapted to alter its position according to the flow of fuel through said casing, a spring adapted to normally retain said disk in a zero indicating position, and connections between said rotatably mounted element and said disk to vary the position of said disk.

4. In a device of the character described, a speed indicator having a pivoted member controlled by the speed of the vehicle, a flow meter adapted to alter its position according to the flow of fuel, a disk rotatably mounted concentric with the pivoted member of the indicator and provided with indicia associated therewith, and means connected between said meter and said disk to rotate the latter as said meter alters its position.

5. In a device of the character described, a speed indicator having a pivoted member controlled by the speed of the vehicle, a flow meter adapted to alter its position according to the flow of fuel, a disk rotatably mounted concentric with the pivoted member of the indicator and provided with indicia associated therewith, a pinion connected with said disk, a pivoted lever provided with a segment gear meshing with said pinion, and operating connections between said lever and said meter.

6. In a device of the character described, a speed indicator having a pivoted member controlled by the speed of the vehicle, a flow meter having a pivoted member adapted to alter its position according to the flow of fuel, a gear carried by the pivoted member of said meter, a disk rotatably mounted concentric with the pivoted member of said indicator and provided with indicia associated therewith, a pinion carried by said disk, a lever pivoted intermediate its ends and provided adjacent its ends with segment gears adapted to mesh with said pinion and said gear, and a spring connected with said lever to normally retain said disk in zero position.

In testimony whereof I affix my signature in presence of two witnesses.

THOMAS L. PARKER.

Witnesses:
K. M. MAIN,
L. E. GRANT.